(12) United States Patent
Degli-Esposti

(10) Patent No.: US 10,145,935 B1
(45) Date of Patent: *Dec. 4, 2018

(54) ESTIMATING THE LOCATION OF A WIRELESS TERMINAL IN THE PURVIEW OF A DISTRIBUTED-ANTENNA SYSTEM

(71) Applicant: Polaris Wireless, Inc., Mountain View, CA (US)

(72) Inventor: Vittorio Degli-Esposti, Sasso Marconi (IT)

(73) Assignee: Polaris Wireless, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/607,686

(22) Filed: May 30, 2017

(51) Int. Cl.
| | |
|---|---|
| *H04M 1/00* | (2006.01) |
| *G01S 5/14* | (2006.01) |
| *H04W 64/00* | (2009.01) |
| *H04W 4/02* | (2018.01) |
| *G01S 5/02* | (2010.01) |
| *H04W 4/20* | (2018.01) |

(52) U.S. Cl.
CPC ............ *G01S 5/14* (2013.01); *H04W 4/02* (2013.01); *H04W 64/003* (2013.01); *G01S 5/02* (2013.01); *G01S 5/0205* (2013.01); *H04W 4/20* (2013.01)

(58) Field of Classification Search
CPC ....... H04W 4/02; H04W 64/003; H04W 4/20; H04W 40/02; H04W 88/02; H04W 88/08; G01S 5/14; G01S 5/02

USPC ........ 455/562.1, 575.7, 25, 63.4, 129, 279.1
See application file for complete search history.

(56) References Cited

U.S. PATENT DOCUMENTS

| | | | |
|---|---|---|---|
| 4,166,274 A | 8/1979 | Reudink et al. | |
| 6,385,464 B1 | 5/2002 | Narita et al. | |
| 6,590,532 B1 | 7/2003 | Ogawa et al. | |
| 9,753,131 B2 * | 9/2017 | Adib ....................... | G01S 13/42 |
| 2001/0005685 A1 | 6/2001 | Nishimori et al. | |
| 2002/0093934 A1 | 7/2002 | Bolgiano et al. | |
| 2005/0003828 A1 | 1/2005 | Sugar et al. | |
| 2006/0078066 A1 | 4/2006 | Yun et al. | |
| 2008/0118004 A1 * | 5/2008 | Forenza ............... | H04B 7/0684 |
| | | | 375/299 |
| 2010/0142481 A1 | 6/2010 | Lim et al. | |
| 2011/0019723 A1 | 1/2011 | Lerner et al. | |
| 2013/0229961 A1 * | 9/2013 | Ma ....................... | H04W 64/00 |
| | | | 370/311 |
| 2017/0192082 A1 | 7/2017 | Zhang | |
| 2017/0195936 A1 | 7/2017 | Want et al. | |
| 2017/0212210 A1 * | 7/2017 | Chen ..................... | G01S 5/06 |
| 2017/0271781 A1 | 9/2017 | Rao et al. | |

\* cited by examiner

*Primary Examiner* — Sonny Trinh
(74) *Attorney, Agent, or Firm* — McGeary Cukor LLC; Jason Paul DeMont; Kenneth Ottesen

(57) ABSTRACT

A wireless telecommunications system that employs a distributed-antenna system is described in which different combinations of radio signals are assigned to antennas so as to facilitate locating a wireless terminal based on the identity of the radio signals it receives above a threshold signal strength.

18 Claims, 15 Drawing Sheets

Wireless Telecommunications System 200
(schematic representation)

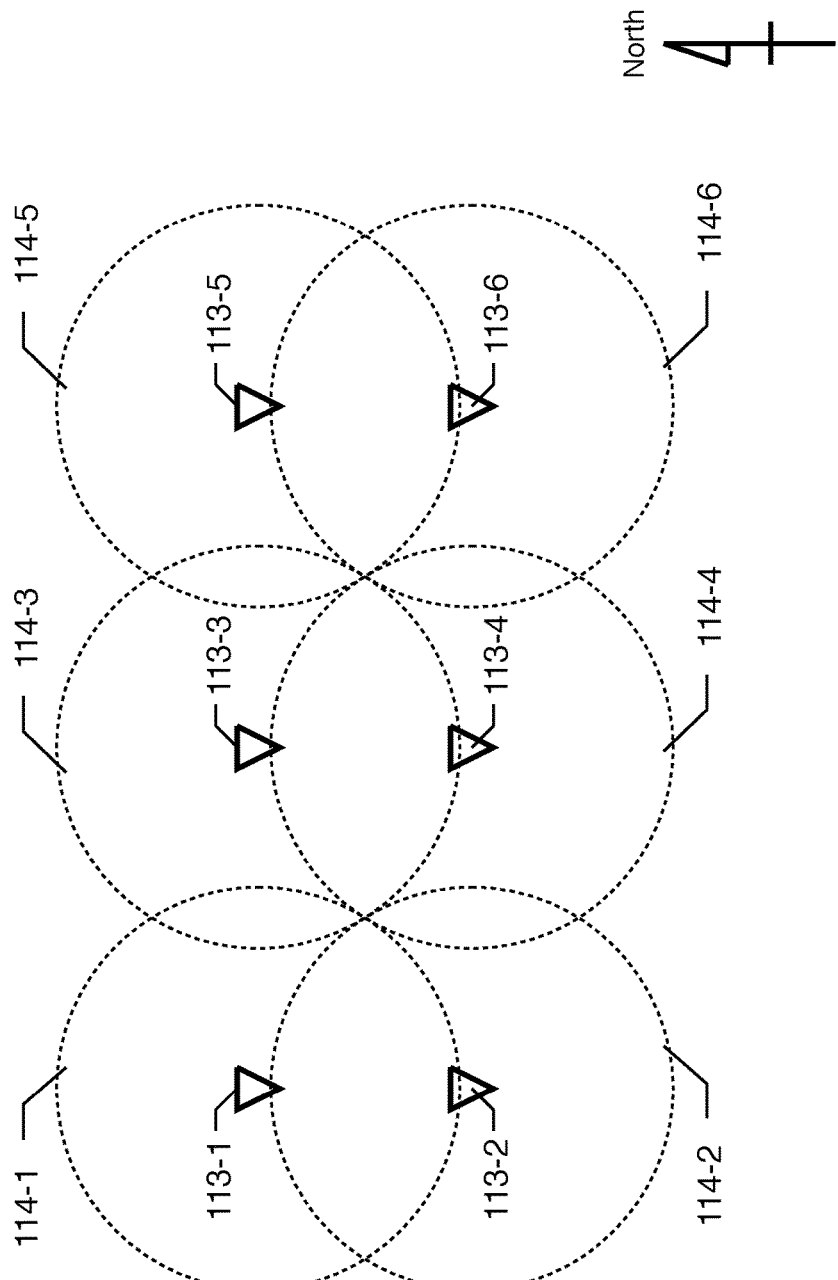

(Prior Art)    Map View of the Service Area Served By Radio Signals $\alpha$, $\beta$, and $\gamma$ in Wireless Telecommunications System 100

Map View of the Service Area of Each Antenna in Wireless Telecommunications System 200

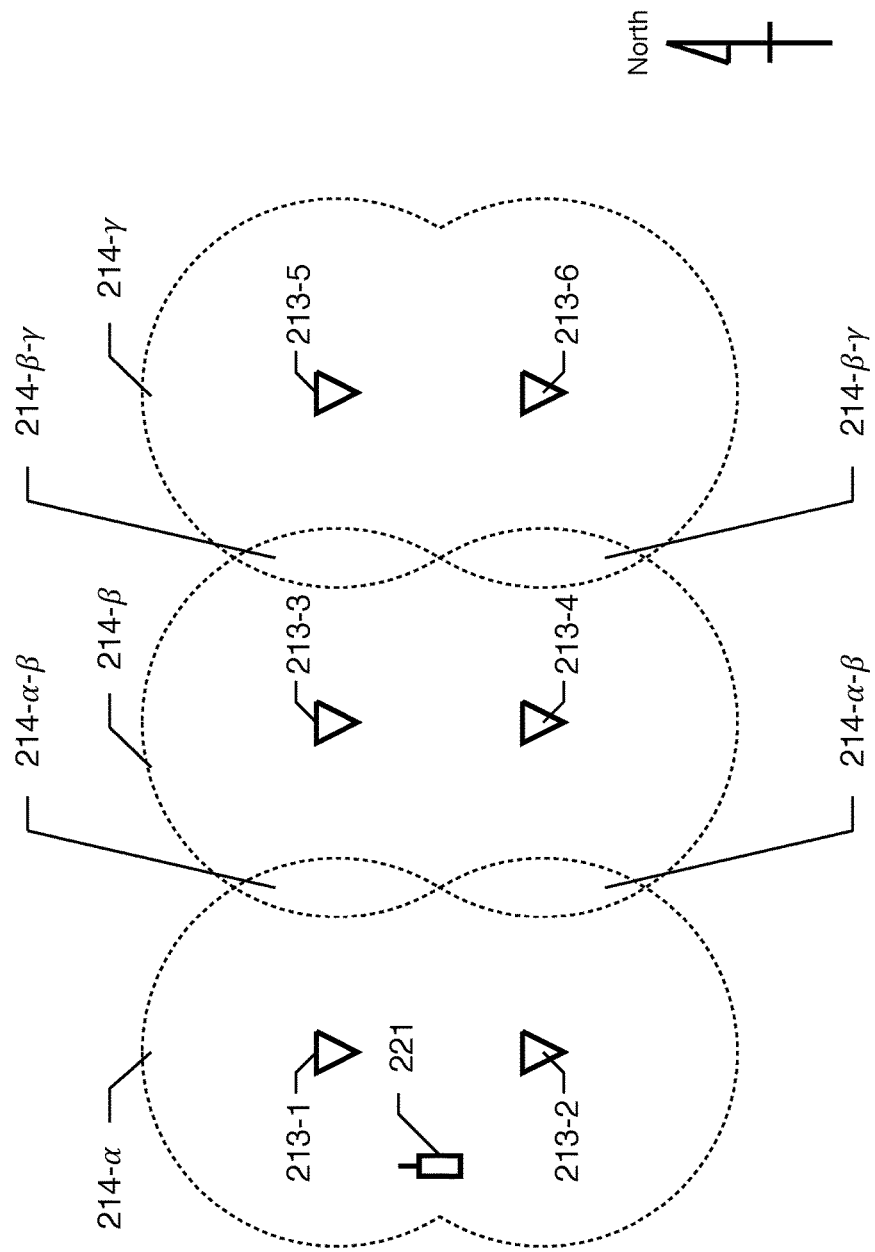

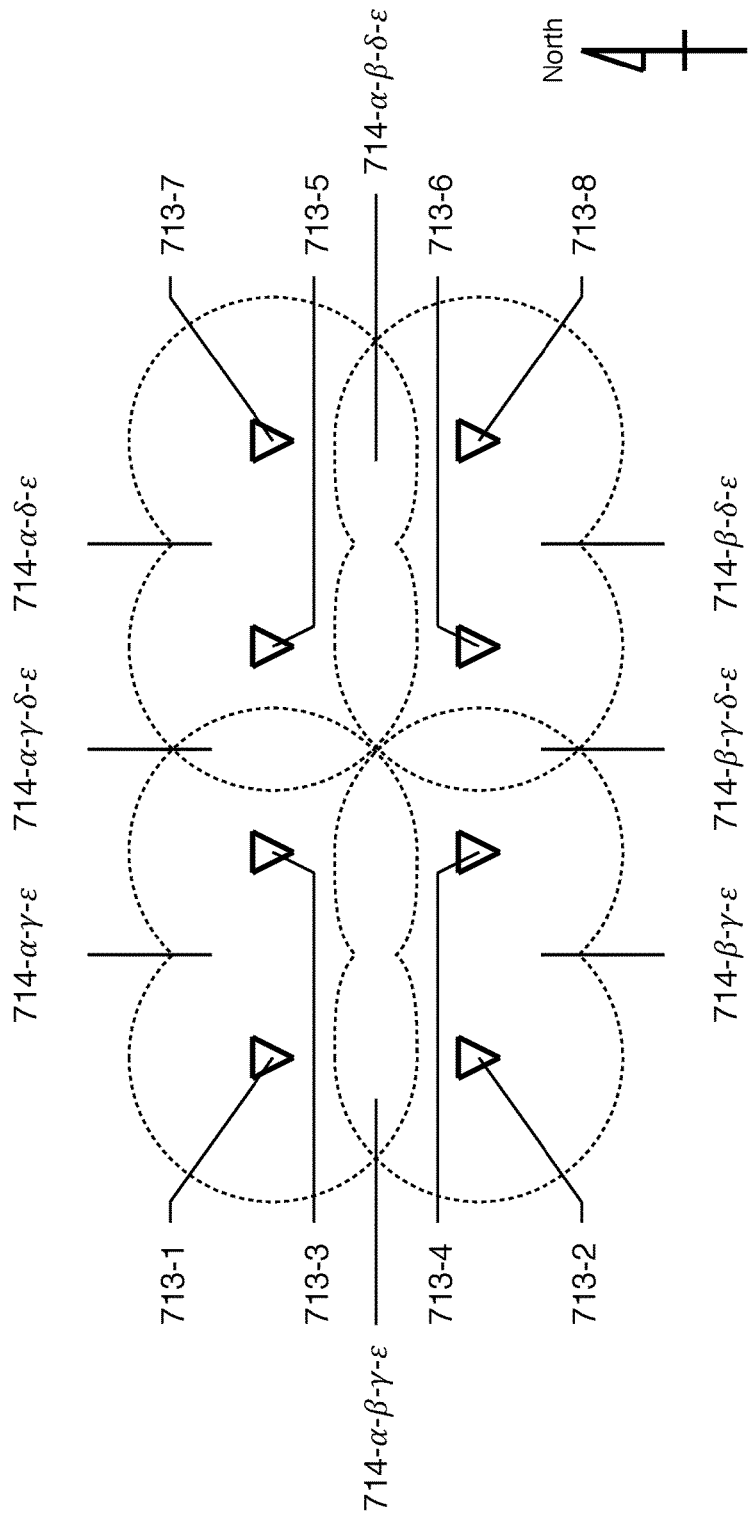

ESTIMATING THE LOCATION OF A WIRELESS TERMINAL IN THE PURVIEW OF A DISTRIBUTED-ANTENNA SYSTEM

FIELD OF THE INVENTION

The present invention relates to wireless telecommunications in general, and, more particularly, to a wireless telecommunications system that employs a distributed-antenna system.

BACKGROUND OF THE INVENTION

A wireless telecommunications system provides telecommunications service to one or more wireless terminals in a three-dimensional spatial region. Some wireless telecommunications systems transmit each distinguishable signal from only one antenna. In contrast, some wireless telecommunications systems transmit an identical signal from two or more spatially-separated antennas.

Two of the types of systems are: phased-array antenna systems and distributed-antenna systems. In a phased-array antenna system, the phase of each signal at each antenna is coordinated in order to precisely affect how the signal, as radiated from each antenna, interferes with itself. In contrast, a distributed-antenna system radiates an identical signal from two or more spatially-distinct antennas in order to tailor the effective service area of the system but there is no attempt to affect the how the signal, as radiated from each antenna, interferes with itself.

SUMMARY OF THE INVENTION

The present invention provides a mechanism for estimating the location of a wireless terminal in the purview of a distributed-antenna system without some of the costs and disadvantages for doing so in the prior art.

For example, when a wireless telecommunications system comprises two or more antenna, there will be some areas where the signals from only one antenna will be received (above a threshold signal strength). These are called non-overlapping service areas. In addition, there might be some areas where the signals from two or more antennas will be received (above a threshold signal strength). These are called overlapping service areas. The number, shape, and character of each non-overlapping and overlapping service area in any particular system is dependent on a number of factors that include:
  i. the number and location of the system's antennas,
  ii. the power with which each radio signal is transmitted at each antenna,
  iii. the frequency of each radio signal, and
  iv. the nature of the radio-frequency environment, which reflect, refract, and absorb each radio signal.

In accordance with the illustrative embodiment, different combinations of radio signals are radiated from different antennas (or combinations of antennas) so that the radio signals received (above a threshold signal strength) in at least some of the non-overlapping and overlapping services areas are different than the radio signals received (above a threshold signal strength) in some of the other service areas. This enables the location of a wireless terminal to be estimated based on the identity of the signal(s) that the wireless terminal receives (above a threshold signal strength) and on the identity of the signal(s) that the wireless terminal does not receive (above a threshold signal strength). In other words, various overlapping and non-overlapping service areas in the purview of the distributed antenna system are identifiable based on the pattern of distinguishable radio signals that the wireless terminal can—and cannot—receive (above a threshold signal strength).

Because the number of antennas—and their respective locations—can vary, it is advantageous to consider the advantages and disadvantages of radiating different combinations of signals from each antenna to determine which assignments of signals to antennas is most desirable in a particular circumstance. In general, however, it will be clear to those skilled in the art, after reading this disclosure, that some patterns of assignments of signals to antennas are particularly advantageous.

BRIEF DESCRIPTION OF THE DRAWINGS

FIG. 1B depicts a map view of the service area served by each antenna in wireless telecommunications system 100.

FIG. 2C depicts a map view of the service area served by each radio signal and each combination of radio signals in wireless telecommunications system 200 with respect to the location of antennas 213-1 through 213-6 and wireless terminal 221.

FIG. 7B depicts a map view of the service area served by each radio signal and each combination of radio signals in wireless telecommunications system 700 with respect to the location of antennas 713-1 through 713-8 and wireless terminal 721.

DETAILED DESCRIPTION

Figure 1A:
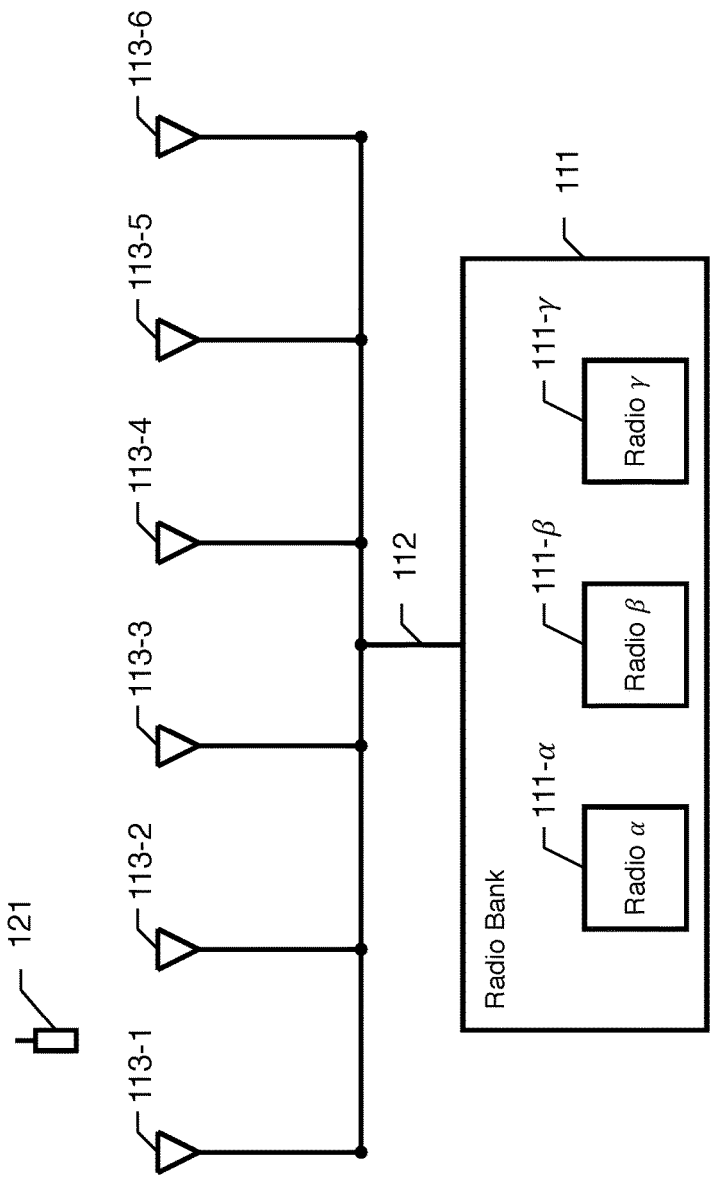
FIG. 1A depicts a schematic diagram of the salient components of wireless telecommunications system 100 in the prior art.

FIG. 1A depicts a schematic diagram of the salient components of wireless telecommunications system 100 in the prior art, which provides telecommunications service to a plurality of wireless terminals that are within the geographic scope one or more of the antennas of system 100. Wireless telecommunications system 100 comprises: radio bank 111, wireline assembly 112, and distributed-antenna system 113.

Radio bank 111 comprises three radios, each with its own distinct hardware: radio 111-α, radio 111-β, and radio 111-γ. Radio 111-a generates modulated radio-frequency carrier signal α; radio 111-β generates modulated radio-frequency carrier signal β, and radio 111-γ generates modulated radio-frequency carrier signal γ. The structure of modulated radio-frequency carrier signal α, modulated radio-frequency carrier signal β, and modulated radio-frequency carrier signal γ is such that a wireless terminal can distinguish each signal from the other signals.

Distributed-antenna system 113 comprises antennas 113-1 through 113-6. Each of antennas 113-1 through 113-6 is more than one wavelength of signals α, β, and γ apart from each other (as depicted in FIG. 1B). Furthermore, the phase of the signals radiated by each of antennas 113-1 through 113-6 is uncoordinated (i.e., distributed-antenna system 113 is not a phased-array). And still furthermore, each of each antennas 113-1 through 113-6 radiates modulated radio-frequency carrier signals α, β, and γ, with the same signal strength.

Wireline assembly 112 comprises the cabling and associated hardware that transports modulated radio-frequency carrier signals α, β, and γ from radio bank 111 to each of antennas 113-1 through 113-6.

Figure 1C:
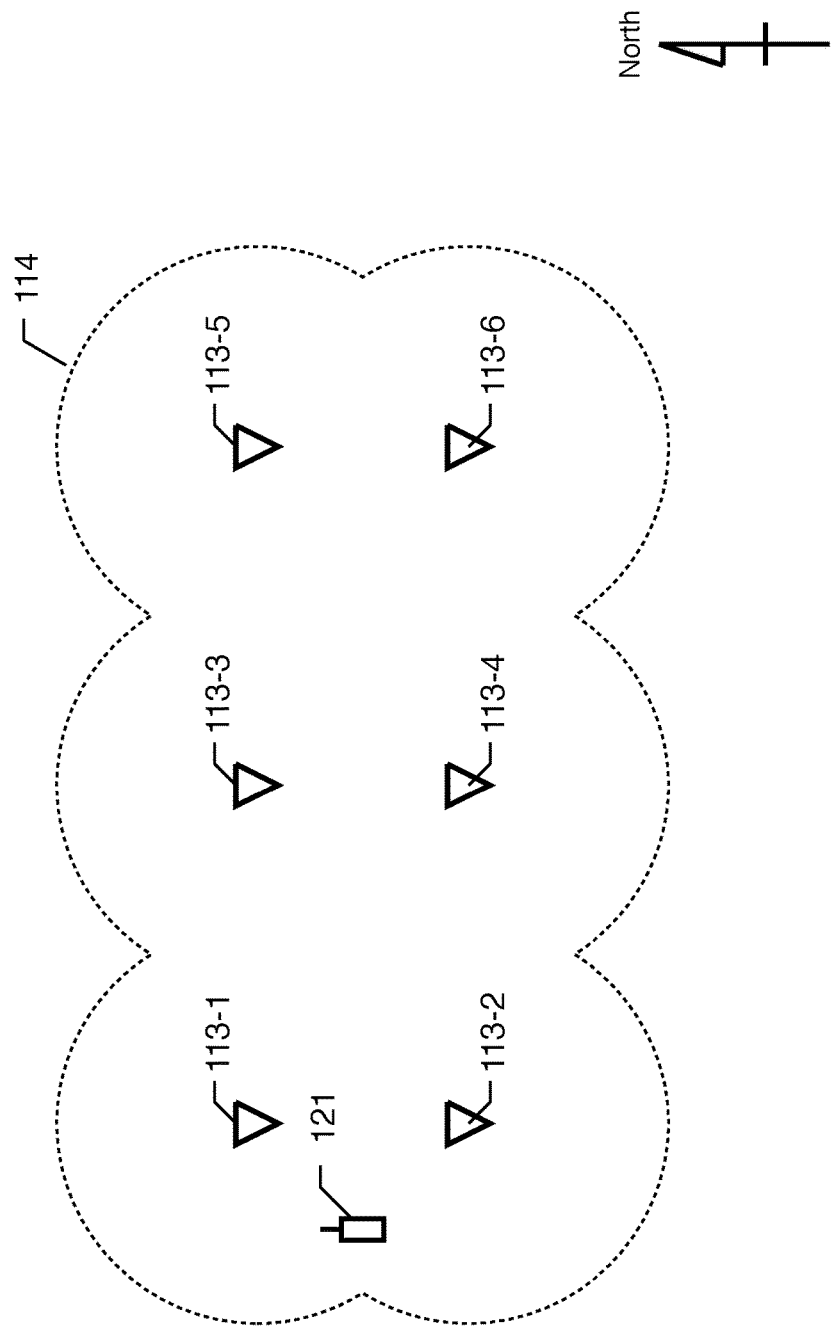
FIG. 1C depicts a map view of the service area served by radio signals α, β, and γ in wireless telecommunications system 100.

FIG. 1B depicts a map view of the service area of each antenna in wireless telecommunications system 100. In particular, the service area of the signal radiated by antenna 113-i is depicted in FIG. 1B as geographic region 114-i, where $i \in \{1\text{-}6\}$. Because each of antennas 113-1 through 113-6 radiates modulated radio-frequency carrier signals α, β, and γ, all three signals have a signal strength above a threshold at each location within the respective service area. In other words, if a wireless terminal receives any one of signals α, β, and γ above the threshold signal strength at any location, then the wireless terminal will also receive the other signals above that threshold signal strength. This fact eliminates the possibility of estimating the location of a wireless terminal within service area 114 based on the identity of the signals that it receives above the threshold signal strength. This is depicted in FIG. 1C, in which all of service area 114 is served by the same combination of signals—radio signals α, β, and γ.

Figure 2A:
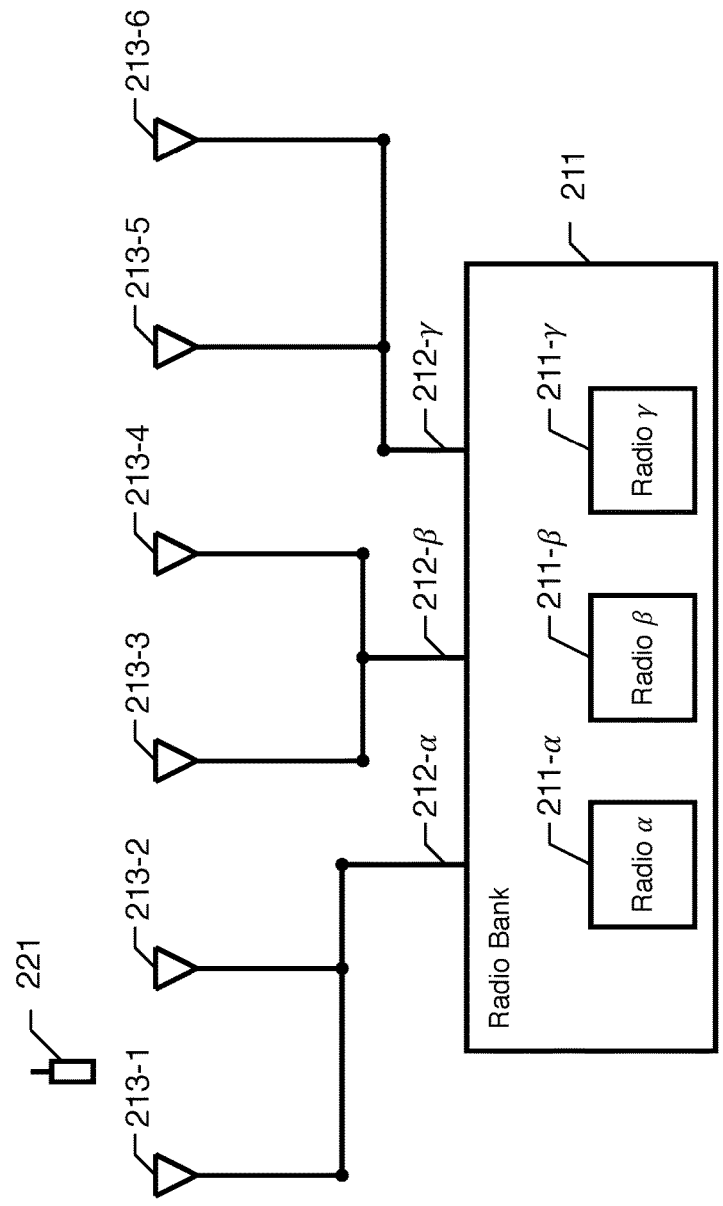
FIG. 2A depicts a schematic diagram of the salient components of wireless telecommunications system 200 in accordance with a first illustrative embodiment of the present invention.

FIG. 2A depicts a schematic diagram of the salient components of wireless telecommunications system 200 in accordance with a first illustrative embodiment of the present invention. Wireless telecommunications system 200 provides telecommunications service to a plurality of wireless terminals that are within the geographic scope of one or more antennas of system 200. Wireless telecommunications system 200 comprises: radio bank 211, wireline assemblies 212-α, 212-β, and 212-γ, and distributed-antenna system 213.

Radio bank 211 is identical to radio bank 111 in the prior art and comprises three radios, each with its own distinct hardware: radio 211-α, radio 211-β, and radio 211-γ. Radio 211-α generates modulated radio-frequency carrier signal α; radio 211-β generates modulated radio-frequency carrier signal β, and radio 211-γ generates modulated radio-frequency carrier signal γ. The structure of modulated radio-frequency carrier signal α, modulated radio-frequency carrier signal β, and modulated radio-frequency carrier signal γ is such that a wireless terminal can distinguish each signal from the other signals.

In some alternative embodiments of the present invention, each radio in radio bank 211 does not comprise distinct hardware but rather is a "software-defined" radio in a "block" or software-defined radio bank. In any case, it will be clear to those skilled in the art how to make and use radio 211-α, radio 211-β, and radio 211-γ.

In accordance with the illustrative embodiment, radio bank 211 generates three radio signals but it will be clear to those skilled in the art, after reading this disclosure, how to make and use alternative embodiments of the present invention that generate any number of radio signals, with either distinct hardware, a software-defined radio, or any combination of the two.

Figure 2B:
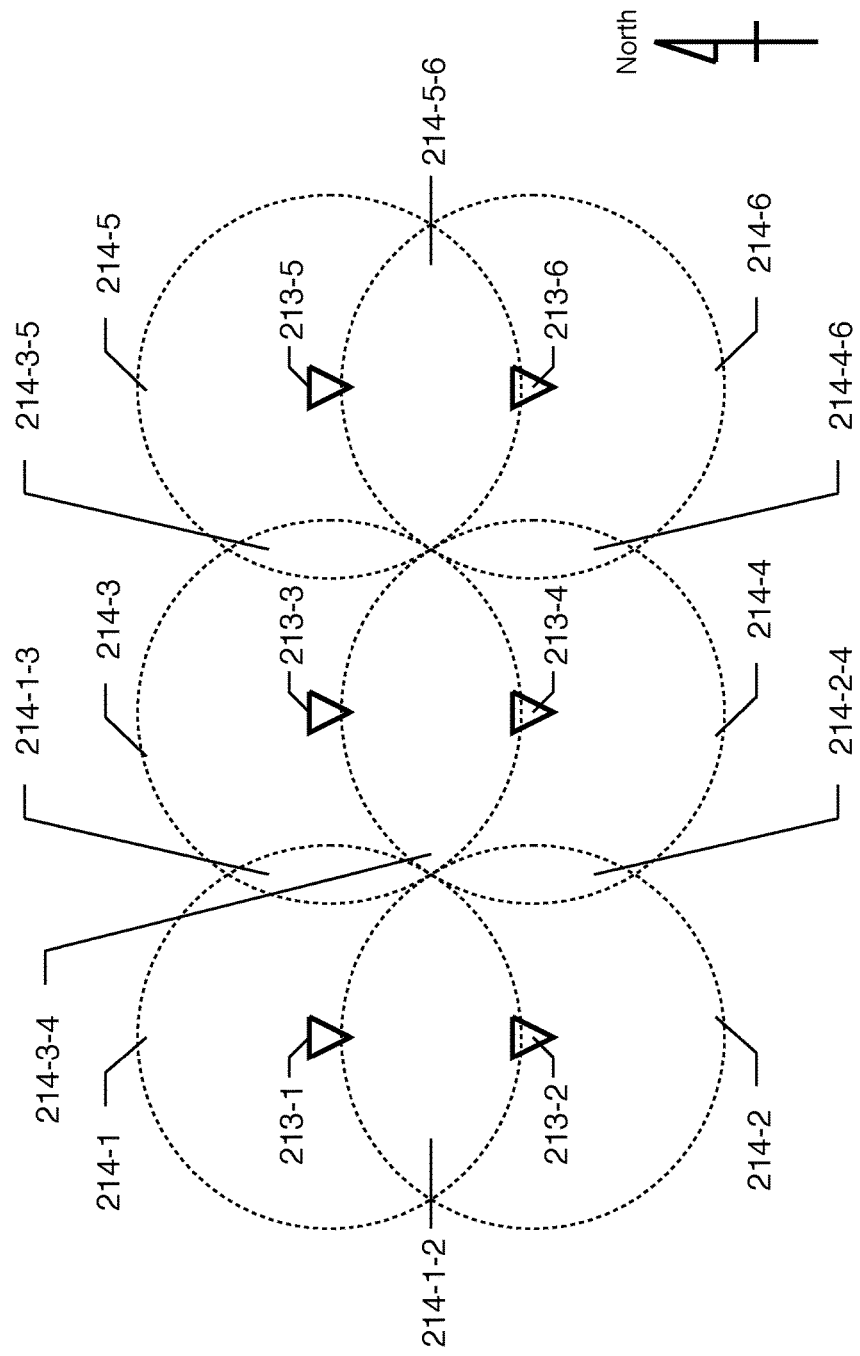
FIG. 2B depicts a map view of the service area of each antenna in wireless telecommunications system 200.

Distributed-antenna system 213 is identical to distributed-antenna system 113 in the prior art and comprises antennas 213-1 through 213-6. Each of antennas 213-1 through 213-6 is more than one wavelength of signals α, β, and γ from each other (as depicted in FIG. 2B). Furthermore, the phase of the signals radiated by each of antennas 213-1 through 213-6 is uncoordinated (i.e., distributed-antenna system 213 is not a phased-array). And still furthermore, each of each antennas 213-1 through 213-6 radiates modulated radio-frequency carrier signals α, β, and γ, with the same signal strength. It will be clear to those skilled in the art, however, after reading this disclosure, how to make and use alternative embodiments of the present invention in which two or more signals are radiated with a different signal strength.

FIG. 2B depicts a map view of the service area of each antenna in wireless telecommunications system 200. The service area of antenna 113-i is depicted in FIG. 1B as geographic region 114-i, where $i \in \{1\text{-}6\}$. For pedagogical reasons, the service area of each antenna in the illustrative embodiments is depicted as approximately round and centered at the antenna. It will be clear to those skilled in the art, however, after reading this disclosure, how to make and use alternative embodiments of the present invention in which the service area of each antenna has any shape and spatial relationship to its corresponding antenna (e.g., in the case of directional or sectorized antennas, etc.).

It can be seen in FIG. 2B that the service areas of individual antennas partially overlap, which is denoted by geographic region 114-1-j that is the overlap of region 114-i and 114-j, wherein $j \in \{1\text{-}6\}$.

Although distributed-antenna system 213 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention in which the antennas have any spatial relationship to each other.

Wireline assembly 212-α comprises the cabling that transports modulated radio-frequency carrier signal α from radio 211-α to antennas 213-1 and 213-2; wireline assembly 212-β comprises the cabling that transports modulated radio-frequency carrier signal β from radio 211-β to antennas 213-3 and 213-4, and wireline assembly 212-γ comprises the cabling that transports modulated radio-frequency carrier signal 211-γ from radio γ to antennas 213-5 and 213-6. It will be clear to those skilled in the art how to make and use wireline assemblies 212-α, 212-β, and 212-γ.

FIG. 2C depicts a map view of the service area served by each radio signal and each combination of radio signals in wireless telecommunications system 200 with respect to the location of antennas 213-1 through 213-6 and wireless terminal 221.

Signal α is radiated only by antennas 213-1 and 213-2 and has a signal strength above a threshold in the area depicted as service area 214-α. Signal β is radiated only by antennas 213-3 and 213-4 and has a signal strength above the threshold in the area depicted as service area 214-β. Signal γ is radiated only by antennas 213-5 and 213-6 and has a signal strength above the threshold in the area depicted as service area 214-γ.

From FIG. 2C, it can be seen that service area 214-α and service area 214-β intersect in the area depicted as service area 214-α-β. Likewise, it can be seen in FIG. 2B that service area 214-β and service area 214-γ intersect in the area depicted as service area 214-β-γ. There is no area that is served by both signal α and signal γ (i.e., service area 214-α does not intersect service area 214-γ).

Wireless telecommunications system 200 is advantageous over system 100 in that it enables the location of wireless terminal 221 to be estimated based on the identity of the signal or signals that wireless terminal 221 receives above the threshold signal strength. For example, if a wireless terminal receives signal α with a signal strength above the threshold—but not receive signal β or signal γ with a signal strength above the threshold—then it is reasonable to estimate the location of the wireless terminal as being within service area 214-α. Analogously, if a wireless terminal receives signal β and signal γ with a signal strength above a threshold—but not receive signal α with a signal strength above that threshold—then it is reasonable to estimate the location of the wireless terminal as being within service area 214-β-γ.

In contrast, wireless telecommunications system 200 is disadvantageous over system 100 in that it offers less service capacity to each location within its purview. In other words, wireless telecommunications system 100 offers three signals of the service capacity to each location within service area 114, whereas system 200 offers only—depending on the location—one or two signals to the service area within its purview. In some situations, the ability of system 200 to locate a wireless terminal outweighs the disadvantage of lower average service capacity per location. In some other situations, the ability of a system to offer higher service capacity per location outweighs the ability of the system to locate a wireless terminal based on the identity of the signals that the wireless terminal receives above the threshold signal strength.

Figure 3A:
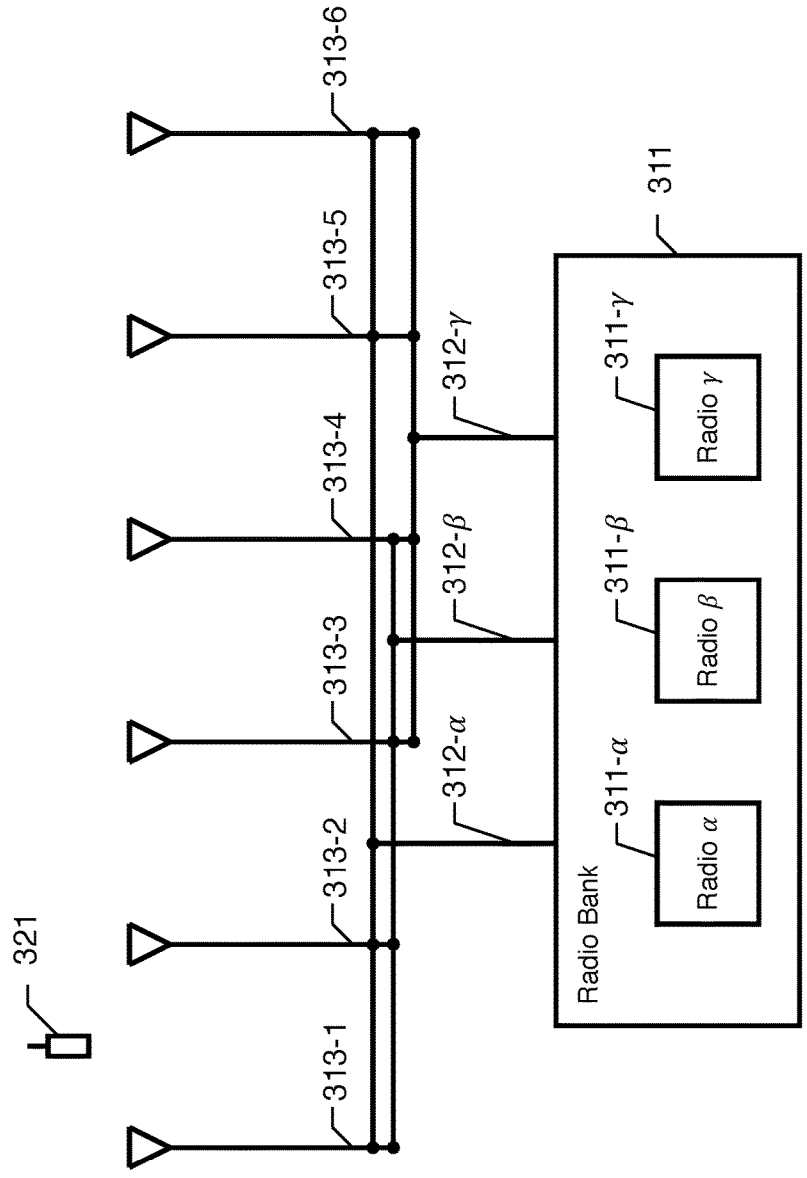
FIG. 3A depicts a schematic diagram of the salient components of wireless telecommunications system 300 in accordance with the first illustrative embodiment of the present invention.
Figure 3B:
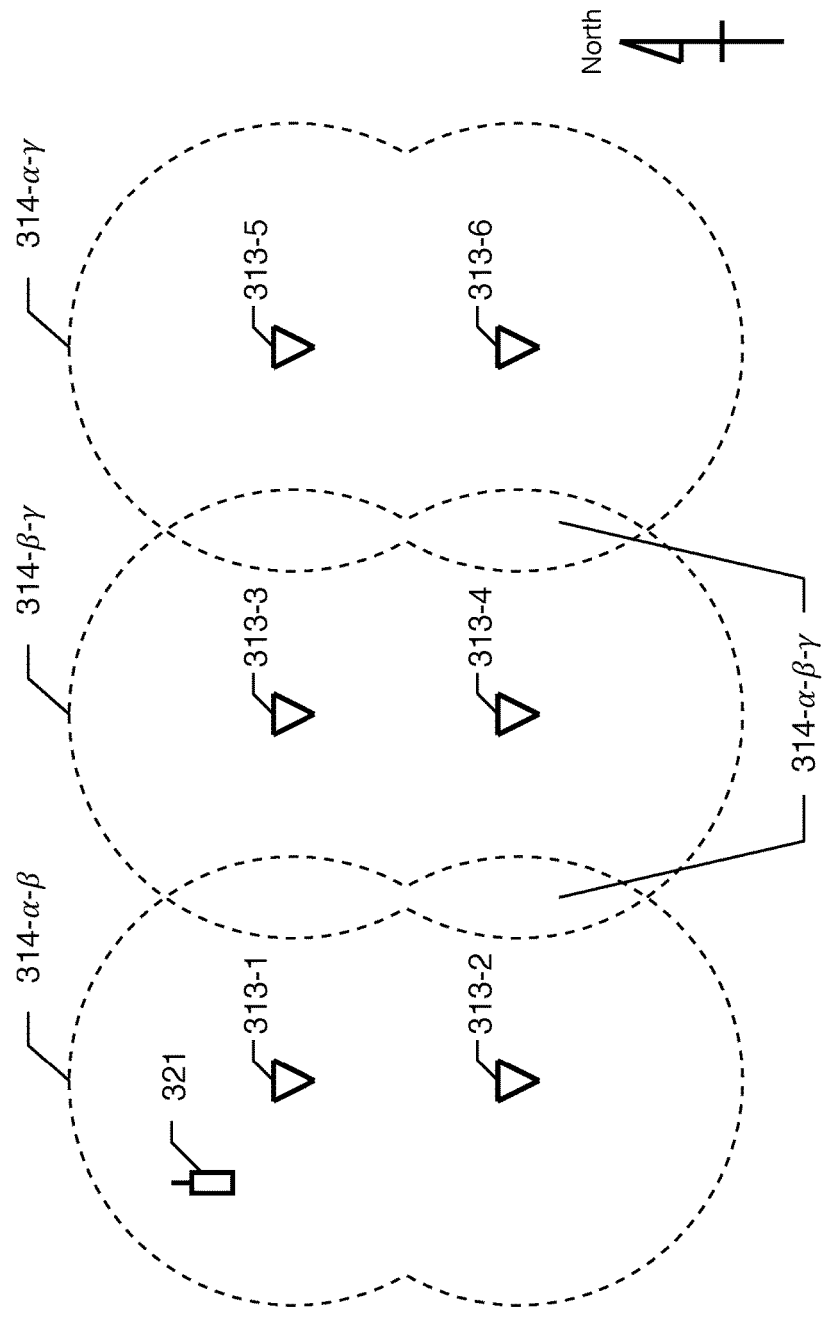
FIG. 3B depicts a map view of the service area served by each radio signal and each combination of radio signals in wireless telecommunications system 300 with respect to the location of antennas 313-1 through 313-6 and wireless terminal 321.

FIG. 3A depicts a schematic diagram of the salient components of wireless telecommunications system 300 in accordance with the first illustrative embodiment of the present invention. Wireless telecommunications system 300 provides telecommunications service to the wireless terminals (e.g., wireless terminal 321) within service area 314 (as depicted in FIGS. 3B and 3C). Wireless telecommunication system comprises: radio bank 311, wireline assemblies 312-α, 312-β, and 312-γ, and distributed-antenna system 313.

Radio bank 311 comprises three radios, each with its own distinct hardware: radio 311-α, radio 311-β, and radio 311-γ. Radio 311-α generates modulated radio-frequency carrier signal α. Similarly, radio 311-β generates modulated radio-frequency carrier signal β, and radio 311-γ generates modulated radio-frequency carrier signal γ. The structure of modulated radio-frequency carrier signal α, modulated radio-frequency carrier signal β, and modulated radio-frequency carrier signal γ is such that a wireless terminal can recognize and distinguish each signal.

In some alternative embodiments of the present invention, each radio in radio bank 311 does not comprise distinct hardware but rather is a "software-defined" radio in a "block" or software-defined radio bank. In any case, it will be clear to those skilled in the art how to make and use radio 311-α, radio 311-β, and radio 311-γ.

Distributed-antenna system 313 comprises antennas 313-1 through 313-6. Each of antennas 313-1 through 313-6 is more than one wavelength of signals α, β, and γ from each other (as depicted in FIGS. 3B and 3C). Furthermore, the phase of the signals radiated by each of antennas 313-1 through 313-6 is uncoordinated (i.e., distributed-antenna system 313 is not a phased-array). And still furthermore, each of each of antennas 313-1 through 313-6 radiates modulated radio-frequency carrier signals α, β, and γ, with the same signal strength. It will be clear to those skilled in the art how to make and use antennas 313-1 through 313-6 in antenna system 313.

Wireline assembly 312-α transports modulated radio-frequency carrier signal α from radio 311-α to antennas 313-1, 313-2, 313-5, and 313-6; wireline assembly 312-β transports modulated radio-frequency carrier signal β from radio 211-β to antennas 313-1, 313-2, 313-3, and 313-4, and wireline assembly 312-γ transports modulated radio-frequency carrier signal γ from radio 311-γ to antennas 313-3, 313-4, 313-5, and 313-6. It will be clear to those skilled in the art how to make and use wireline assemblies 312-α, 312-β, and 312-γ.

FIG. 3B depicts a map view of the service area served by each radio signal and each combination of radio signals in wireless telecommunications system 300 with respect to the location of antennas 313-1 through 313-6 and wireless terminal 321.

Signal α is radiated only by antennas 313-1, 313-2, 313-5, and 313-6 and has a signal strength above a threshold in the areas depicted as service areas 314-α-β and 314-α-β-γ. Signal β is radiated only by antennas 313-1, 313-2, 313-3, and 313-4 and has a signal strength above the threshold in the areas depicted as service areas 314-α-β-γ and 314-β-γ.

Although distributed-antenna system 313 comprises six antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention in which the antennas have any spatial relationship to each other.

Wireless telecommunications system 300 is advantageous over system 100 in that it enables the location of a wireless terminal to be estimated based on the identity of the signal or signals that it receives above the threshold signal strength. For example, if a wireless terminal receives signal α and signal β with a signal strength above the threshold, but does not receive signal γ with a signal strength above the threshold, then it is reasonable to estimate the location of the wireless terminal as being within service area 314-α-β and not in service area 314-β-γ or service area 314-α-γ.

Wireless telecommunications system 300 is disadvantageous, however, in that it comprises two non-contiguous service areas 314-α-β-γ with the same signals. Therefore, if a wireless terminal receives signal α and signal β and signal γ with a signal strength above the threshold, then the location of the wireless terminal could be in either the western service area 314-α-β-γ or the eastern service area 314-α-β-γ, but not, of course, in service area 314-α-β, service area 314-β-γ, or service area 314-α-γ.

Figure 6:
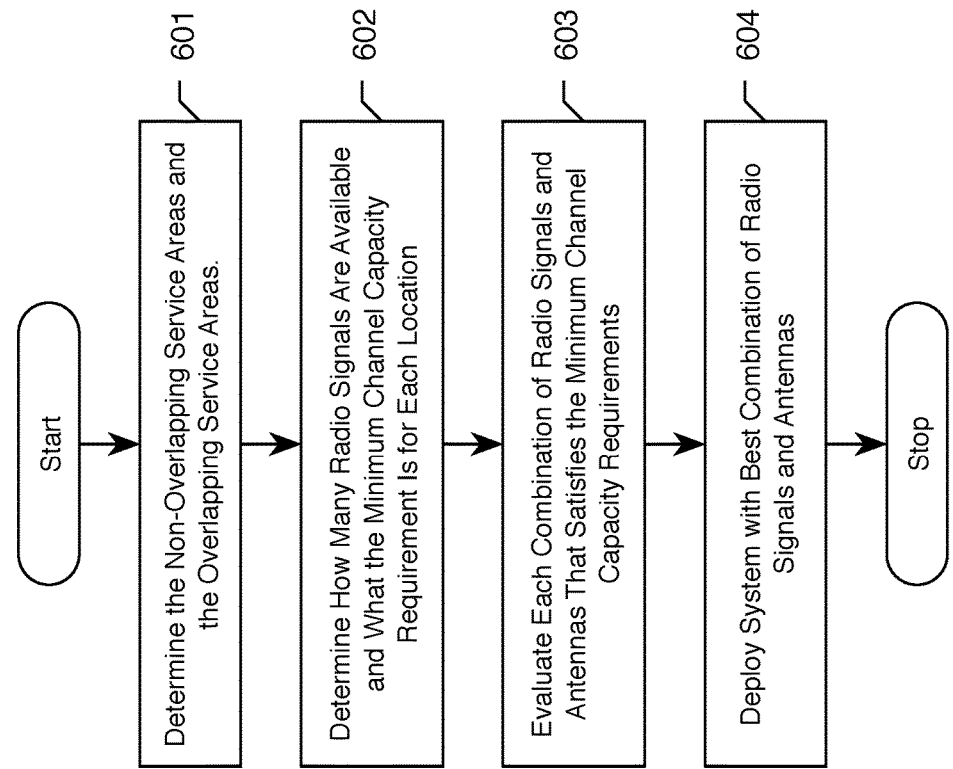
FIG. 6 depicts a flowchart of a process that can facilitate the deployment of a wireless telecommunications system in accordance the present invention.

FIG. 6 depicts a flowchart of a process that can facilitate the deployment of a wireless telecommunications system in accordance the present invention. It will be clear to those skilled in the art, after reading this disclosure, how to make and use embodiments of the present invention without using this process.

At task 601, the designer/operator of a system determines the "non-overlapping service areas" of the system, which are the locations served only by one antenna and the "overlapping service areas" of the system, which are the locations serviced by two or more antennas. These areas are determined by, for example, the geographic location of each antenna, the geographic terrain, the radio-frequency obstacles in the vicinity of the system, the type of antennas used, and the radiated signal strength of each signal from each antenna. For example, the non-overlapping service areas in system 300 are depicted in FIG. 1B and are 214-1, 214-2, 214-3, 214-4, 214-5, and 214-6. FIG. 1B also depicts the overlapping service areas for system 300, which are: 214-1-2, 214-1-3, 214-2-4, 214-3-4, 214-3-5, 214-4-6, and 214-5-6. It will be clear to those skilled in the art, after reading this disclosure, how to make and use alternative embodiments of the present invention that have any arrangement of non-overlapping service areas and overlapping service areas.

At task 602, the designer/operator of the system determines how many distinct radio signals are available to be radiated via the distributed-antenna system. For example, in system 100, system 200, and system 300, there are three distinct radio signals available. In system 400, system 500, and system 700, there are five distinct radio signals available. It will be clear to those skilled in the art, after reading this disclosure, how to make and use embodiments of the present invention that have any number of distinct radio signals that are available for deployment.

As part of task 602, the designer/operator of the system determines the minimum service capacity requirement for each location in the system, which is based on the number of channels provided by each (downlink) signal. For example, if the minimum service capacity requirement for each location in an arrangement of non-overlapping and overlapping service signals such as depicted in FIG. 1B is six channels per location and each signal carries two channels, then all three signals—signal α and signal β and signal γ—must be radiated from each antenna, as shown in FIG. 1A, to ensure that six channels of service capacity is provided to each location.

In contrast, if the minimum channel capacity requirement for each location in an arrangement of non-overlapping and overlapping service signals such as depicted in FIG. 1B is four channels signals per location and each signal carries two channels, then either system 300 (as depicted in FIG. 3A) or system 100 (as depicted in FIG. 1A) may be deployed.

Lastly, if the minimum channel capacity requirement for each location in an arrangement of non-overlapping and overlapping service signals such as depicted in FIG. 1B is two channels per location and each signal carries two channels, then either system 300 (as depicted in FIG. 3A) or system 200 (as depicted in FIG. 2B) or system 100 (as depicted in FIG. 1A) may be deployed.

At task 603, the designer/operator of the system evaluates the location discrimination capability of each combination of radio signals and antennas that satisfy the minimum service capacity requirement. This involves well-known combinatoric analysis and is easily performed by a computer. For example, if a distributed-antenna system comprises a antennas, s available radio signals, and the minimum service capacity requirement for each location is m radio signals per location, there are a maximum of E non-distinct possible deployments to evaluate, wherein:

$$E \leq a^{C(s,m)-1} \quad (1)$$

a equals the number of antennas,
s equals the number of available distinct radio signals,
m equals the minimum number of signals to satisfy the service capacity requirement for each location, and
C(s,m) is the number of combinations of s choosing m at a time.

Furthermore, it will be clear to those skilled in the art that there are symmetries and other mathematical simplifications—depending on the system being analyzed—that generally make the actual number of possible deployments to evaluate substantially smaller than E. As one illustrative consideration, the designer/operator might not want the combination of signals present in one service area to equal the combination of signals present in another service area. As another illustrative consideration, the designer/operator might want the location discrimination ability of some areas to be more precise than in some other areas.

At task 604, the designer/operator deploys the telecommunications system with the combination of radio assignments to antennas that he or she decides best satisfies combination of the location discrimination and services capacity attributes for each location.

Figure 4A:
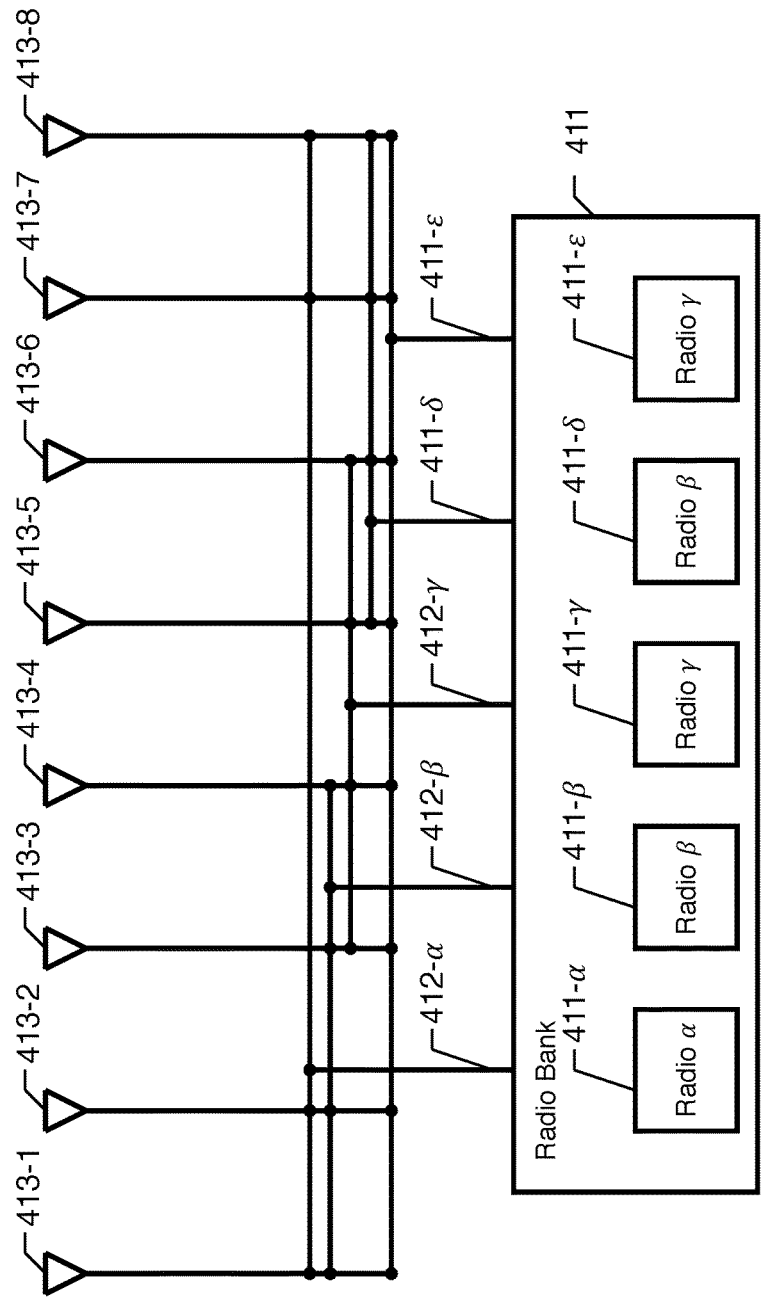
FIG. 4A depicts a schematic diagram of the salient components of wireless telecommunications system 400 in accordance with the second illustrative embodiment of the present invention.
Figure 4B:
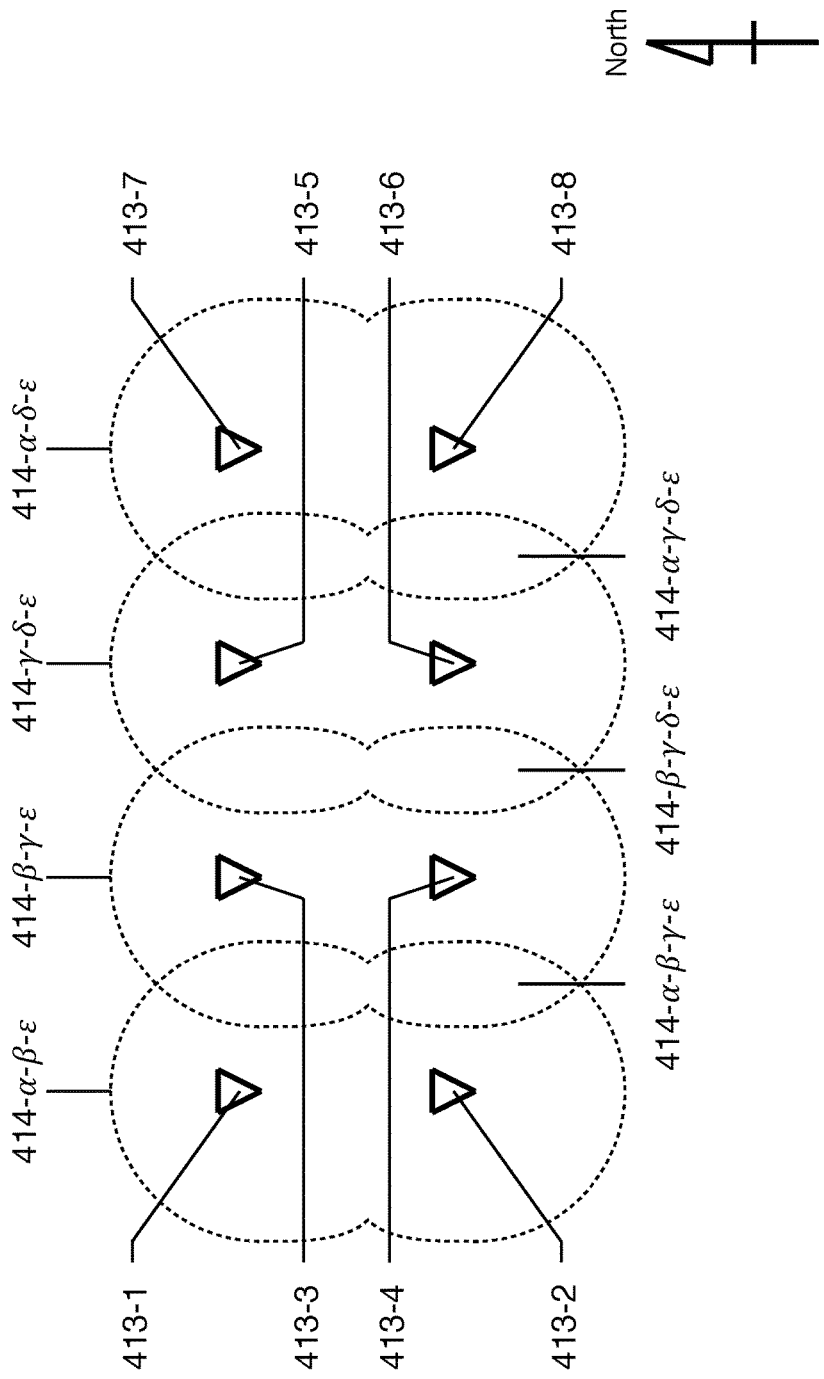
FIG. 4B depicts a map view of the service area served by each radio signal and each combination of radio signals in wireless telecommunications system 400 with respect to the location of antennas 413-1 through 413-8 and wireless terminal 421.

FIG. 4A depicts a schematic diagram of the salient components of wireless telecommunications system 400 in accordance with the second illustrative embodiment of the present invention. Wireless telecommunications system 400 provides telecommunications service to the wireless terminals (e.g., wireless terminal 421) within service area 414 (as depicted in FIG. 4B). Wireless telecommunication system comprises: radio bank 411, wireline assembly 412-α, wireline assembly 412-β, wireline assembly 411-γ, wireline assembly 412-δ, wireline assembly 412-ε, and distributed-antenna system 413.

Radio bank 411 comprises five radios, each with its own distinct hardware: radio 411-α, radio 411-β, radio 411-γ, radio 411-δ, and radio 411-ε. Radio 411-α generates modulated radio-frequency carrier signal α. Radio 411-β generates modulated radio-frequency carrier signal β. Radio 411-γ generates modulated radio-frequency carrier signal γ. Radio 411-δ generates modulated radio-frequency carrier signal δ. Radio 411-ε generates modulated radio-frequency carrier signal ε. The structure of modulated radio-frequency carrier signal α, modulated radio-frequency carrier signal β, modulated radio-frequency carrier signal γ, modulated radio-frequency carrier signal δ, and modulated radio-frequency carrier signal ε is such that a wireless terminal can recognize and distinguish each signal.

In some alternative embodiments of the present invention, each radio in radio bank 411 does not comprise distinct hardware but rather is a "software-defined" radio in a "block" or software-defined radio bank. In any case, it will be clear to those skilled in the art how to make and use radio 411-α, radio 411-β, radio 411-γ, radio 411-δ, and radio 411-ε.

Distributed-antenna system 413 comprises eight antennas 413-1 through 413-8. Each of antennas 413-1 through 413-8 is more than one wavelength of signals α, β, γ, δ, and ε from each other (as depicted in FIG. 4B). Furthermore, the phase of the signals radiated by each of antennas 413-1 through 413-8 is uncoordinated (i.e., distributed-antenna system 413 is not a phased-array). And still furthermore, each of each of antennas 413-1 through 413-8 radiates modulated radio-frequency carrier signals α, β, γ, δ, and ε with the same signal strength. It will be clear to those skilled in the art, however, after reading this disclosure, how to make and use alternative embodiments of the present invention in which two or more signals are radiated with a different signal strength. It will be clear to those skilled in the art how to make and use antennas 413-1 through 413-8 in antenna system 413.

Wireline assembly 412-α transports modulated radio-frequency carrier signal α from radio 411-α to antennas 413-1, 413-2, 413-7, and 413-8. Wireline assembly 412-β transports modulated radio-frequency carrier signal β from radio 411-β to antennas 413-1, 413-2, 413-3, and 413-4. Wireline assembly 412-γ transports modulated radio-frequency carrier signal γ from radio 411-γ to antennas 413-3, 413-4, 413-5, and 413-6. Wireline assembly 412-δ transports modulated radio-frequency carrier signal δ from radio 411-δ to antennas 413-5, 413-6, 413-7, and 413-8. Wireline assembly 412-E transports modulated radio-frequency carrier signal ε from radio 411-ε to antennas 413-1, 413-2, 413-3, 413-4, 413-5, 413-6, 413-7, and 413-8. It will be clear to those skilled in the art how to make and use wireline assemblies 412-α, 412-β, 412-γ, 412-δ, and 412-ε.

FIG. 4B depicts a map view of the service area served by each radio signal and each combination of radio signals in wireless telecommunications system 400 with respect to the location of antennas 413-1 through 413-8 and wireless terminal 421.

Signal α is radiated only by antennas 413-1, 413-2, 413-7, and 413-8 and has a signal strength above a threshold in the areas depicted as service areas 414-α-β-ε, 414-α-β-γ-ε, 414-α-δ-ε, and 414-α-δ-γ-ε. Signal β is radiated only by antennas 413-1, 413-2, 413-3, and 413-4 and has a signal strength above the threshold in the areas depicted as service areas 414-α-β-ε, 414-α-β-γ-ε, 414-β-γ-ε, and 414-β-γ-δ-ε. Signal γ is radiated only by antennas 413-3, 413-4, 413-5, and 413-6 and has a signal strength above the threshold in the areas depicted as service areas 414-α-β-γ-ε, 414-β-γ-ε, 414-β-γ-δ-ε, and 414-γ-δ-ε. Signal δ is radiated only by antennas 413-4, 413-5, 413-6, and 413-7 and has a signal strength above the threshold in the areas depicted as service areas 414-β-γ-δ-ε, 414-γ-δ-ε, 414-α-γ-δ-ε, and 414-α-δ-ε. Signal δ is radiated by all eight antennas 413-1, 413-2, 413-3, 413-4, 413-5, 413-6, 413-7, and 413-8 and has a signal strength above the threshold in all of service area 414.

Although distributed-antenna system 413 comprises eight antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention in which the antennas have any spatial relationship to each other.

By having five radios available for system 400 but only requiring a minimum service capacity that requires 3 radio signals per location, there is a great deal of flexibility in assigning (and not assigning) radio signals to antennas, which provides a system that offers the required minimum service capacity per location and that provides good location discrimination based solely on the identity of the radio signals it receives above the threshold signal strength. It will be clear to those skilled in the art, after reading this disclosure, that there are many alternative ways of assigning combinations of radios to the eight antennas to satisfy different minimum service capacities per location (e.g., one radio signal per location minimum, two radio signals per location minimum, four radio signals per minimum) with different location discrimination. For example, wireless telecommunications system 700, as described below and in the accompanying figures describes one such alternative.

Figure 5A:
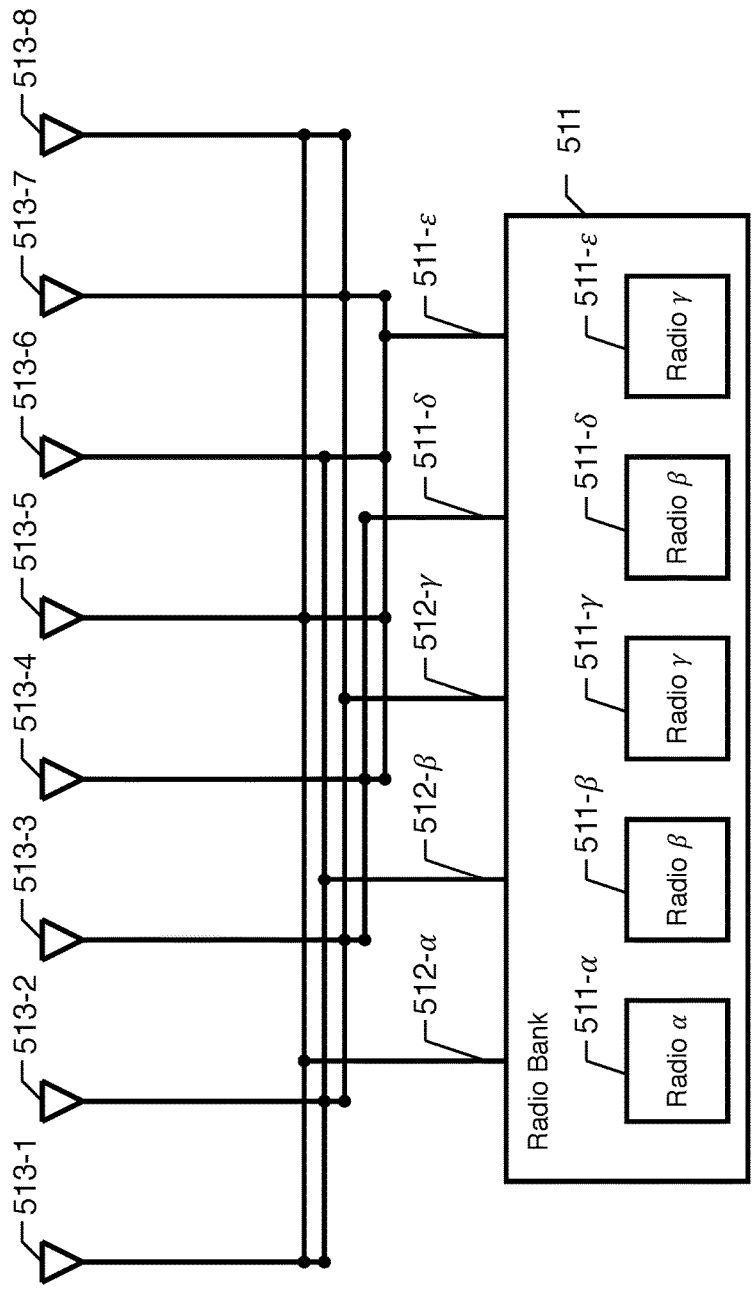
FIG. 5A depicts a schematic diagram of the salient components of wireless telecommunications system 500 in accordance with the third illustrative embodiment of the present invention.
Figure 5B:
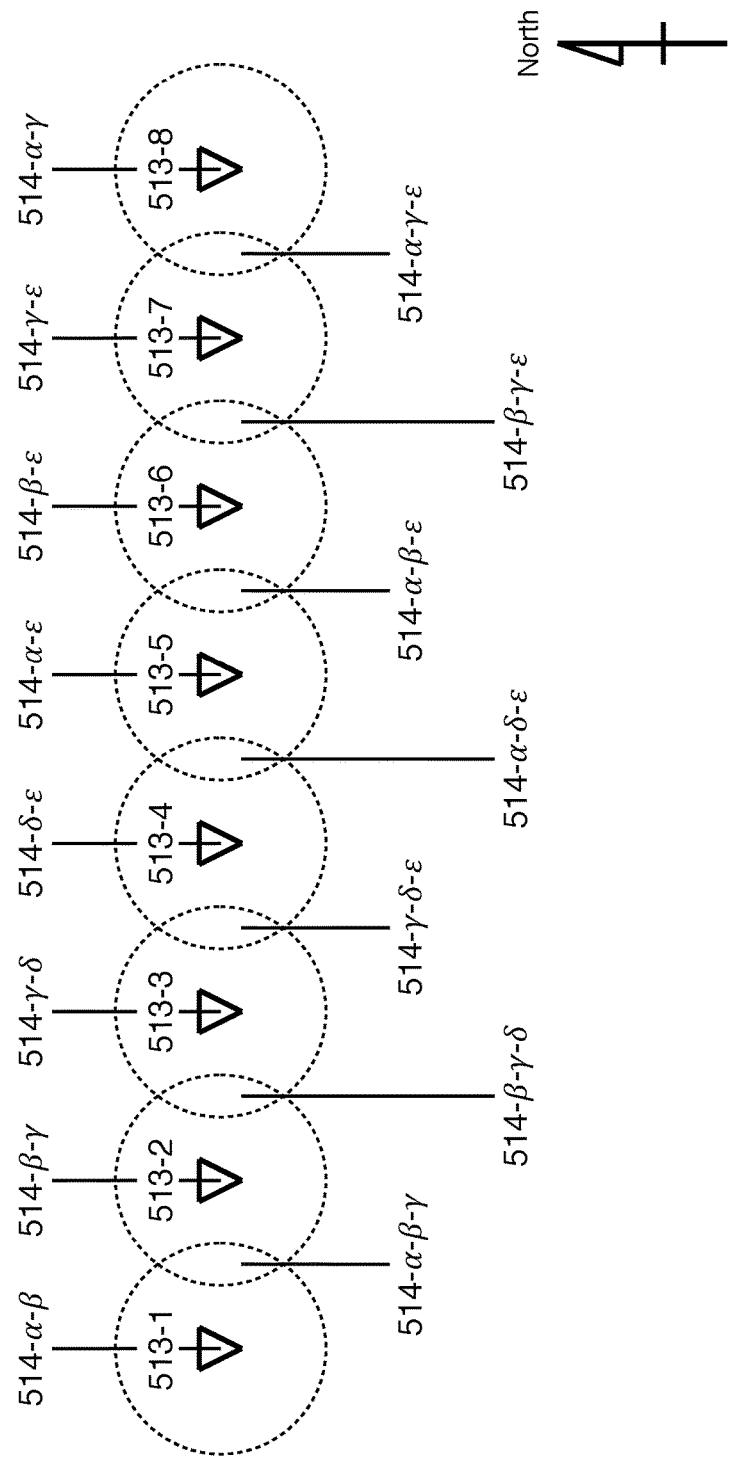
FIG. 5B depicts a map view of the service area served by each radio signal and each combination of radio signals in wireless telecommunications system 500 with respect to the location of antennas 513-1 through 513-8 and wireless terminal 521.

FIG. 5A depicts a schematic diagram of the salient components of wireless telecommunications system 500 in accordance with the third illustrative embodiment of the present invention. Wireless telecommunications system 500 provides telecommunications service to the wireless terminals (e.g., wireless terminal 521) within service area 514 (as depicted in FIG. 5B). Wireless telecommunication system comprises: radio bank 511, wireline assembly 512-α, wireline assembly 512-β, wireline assembly 511-γ, wireline assembly 512-δ, wireline assembly 512-ε, and distributed-antenna system 513.

Radio bank 511 comprises five radios, each with its own distinct hardware: radio 511-α, radio 511-β, radio 511-γ, radio 511-δ, and radio 511-ε. Radio 511-α generates modulated radio-frequency carrier signal α. Radio 511-β generates modulated radio-frequency carrier signal β. Radio 511-γ generates modulated radio-frequency carrier signal γ. Radio 511-δ generates modulated radio-frequency carrier signal δ. Radio 511-ε generates modulated radio-frequency carrier signal ε. The structure of modulated radio-frequency carrier signal α, modulated radio-frequency carrier signal β, modulated radio-frequency carrier signal γ, modulated radio-frequency carrier signal δ, and modulated radio-frequency carrier signal ε is such that a wireless terminal can recognize and distinguish each signal In some alternative embodiments of the present invention, each radio in radio bank 511 does not comprise distinct hardware but rather is a "software-defined" radio in a "block" or software-defined radio bank. In any case, it will be clear to those skilled in the art how to make and use radio 511-α, radio 511-β, radio 511-γ, radio 511-δ, and radio 511-ε.

Distributed-antenna system 513 comprises eight antennas 513-1 through 513-8. Each of antennas 513-1 through 513-8 is more than one wavelength of signals α, β, γ, δ, and E from each other (as depicted in FIG. 5B). Furthermore, the phase of the signals radiated by each of antennas 513-1 through 513-8 is uncoordinated (i.e., distributed-antenna system 513 is not a phased-array). And still furthermore, each of each of antennas 513-1 through 513-8 radiates modulated radio-frequency carrier signals α, β, γ, δ, and ε with the same signal strength. It will be clear to those skilled in the art, however, after reading this disclosure, how to make and use alternative embodiments of the present invention in which two or more signals are radiated with a different signal strength. It will be clear to those skilled in the art how to make and use antennas 513-1 through 513-8 in antenna system 513.

Wireline assembly 512-α transports modulated radio-frequency carrier signal α from radio 511-α to antennas 513-1, 513-5, and 513-8. Wireline assembly 512-β transports modulated radio-frequency carrier signal β from radio 511-β to antennas 513-1, 513-2, and 513-6. Wireline assembly 512-γ transports modulated radio-frequency carrier signal γ from radio 511-γ to antennas 513-2, 513-3, 513-7, and 513-8. Wireline assembly 512-δ transports modulated radio-frequency carrier signal δ from radio 511-δ to antennas 513-3 and 513-4. Wireline assembly 512-ε transports modulated radio-frequency carrier signal ε from radio 511-ε to antennas 513-4, 513-5, 513-6, and 513-7. It will be clear to those skilled in the art how to make and use wireline assemblies 512-α, 512-β, 512-γ, 512-δ, and 512-ε.

FIG. 5B depicts a map view of the service area served by each radio signal and each combination of radio signals in wireless telecommunications system 500 with respect to the location of antennas 513-1 through 513-8 and wireless terminal 521.

Signal α is radiated only by antennas 513-1, 513-5, and 513-8 and has a signal strength above a threshold in the areas depicted as service areas 514-α-β, 514-α-β-γ, 514-α-δ-ε, 514-α-ε, 514-α-β-ε, and 514-α-γ-ε, and 514-α-γ. Signal β is radiated only by antennas 513-1, 513-2, and 513-6 and has a signal strength above the threshold in the areas depicted as service areas 514-α-β, 514-α-β-γ, 514-β-γ, 514-β-γ-δ, 514-α-β-ε, 514-β-ε, and 514-β-γ-ε. Signal γ is radiated only by antennas 513-2, 513-3, 513-7, and 513-8 and has a signal strength above the threshold in the areas depicted as service areas 514-α-β-γ, 514-β-γ, 514-β-γ-δ, 514-γ-δ, 514-γ-δ-ε, 514-β-γ-ε, 514-γ-ε, 514-α-γ-ε, and 514-α-γ. Signal δ is radiated only by antennas 513-3 and 513-4 and has a signal strength above the threshold in the areas depicted as service areas 514-β-γ-δ, 514-γ-δ, 514-γ-δ-ε, 514-δ-ε, and 514-α-δ-ε. Signal E is radiated only by antennas 513-4, 513-5, 513-6, and 513-7 and has a signal strength above the threshold in the areas depicted as service areas 514-γ-δ-ε, 514-δ-ε, 514-α-δ-ε, 514-α-ε, 514-α-β-ε, 514-β-ε, 514-β-γ-ε, 514-γ-ε, and 514-α-γ-ε. System 500 exhibits a high degree of location discrimination because each service area (overlapping and non-overlapping) is associated with a unique combination of signals.

Figure 7A:
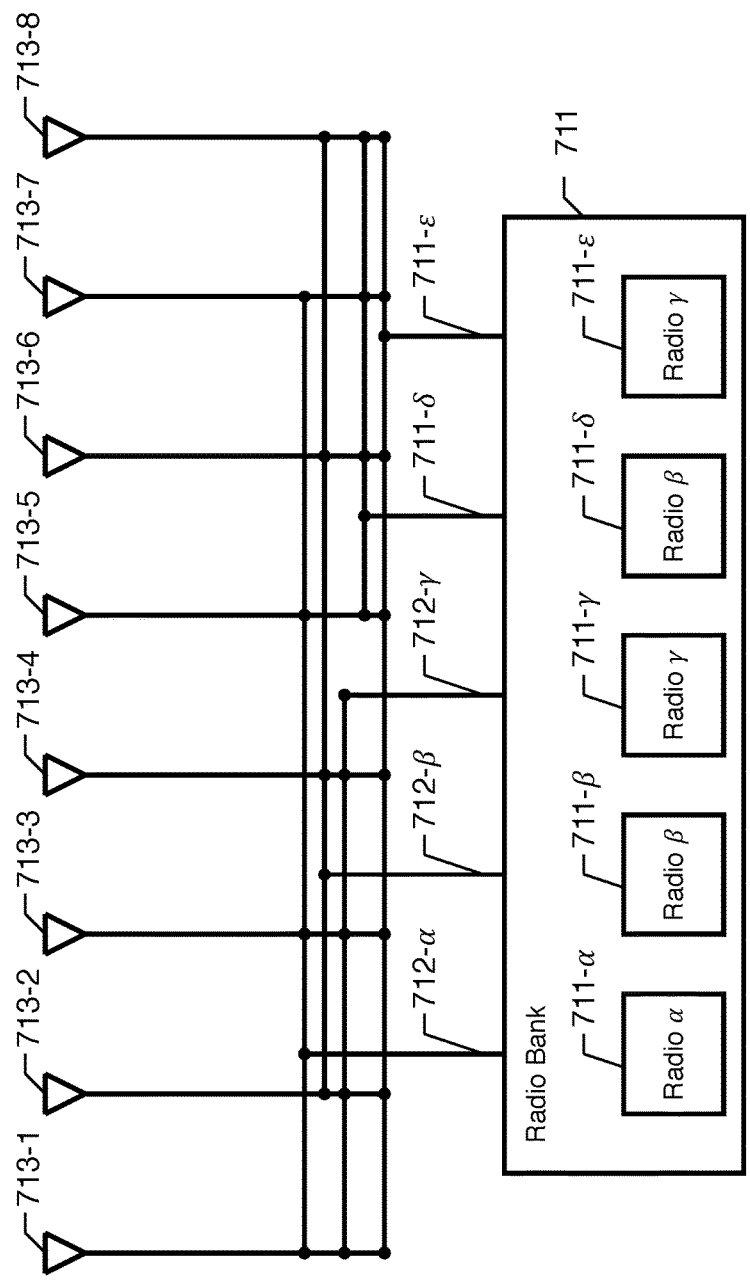
FIG. 7A depicts a schematic diagram of the salient components of wireless telecommunications system 700 in accordance with the second illustrative embodiment of the present invention.

FIG. 7A depicts a schematic diagram of the salient components of wireless telecommunications system 700 in accordance with the second illustrative embodiment of the present invention. Wireless telecommunications system 700 provides telecommunications service to the wireless terminals (e.g., wireless terminal 721) within service area 714 (as depicted in FIG. 7B). Wireless telecommunication system comprises: radio bank 711, wireline assembly 712-α, wireline assembly 712-β, wireline assembly 711-γ, wireline assembly 712-δ, wireline assembly 712-ε, and distributed-antenna system 713.

Radio bank 711 comprises five radios, each with its own distinct hardware: radio 711-α, radio 711-β, radio 711-γ, radio 711-δ, and radio 711-ε. Radio 711-α generates modulated radio-frequency carrier signal α. Radio 711-β generates modulated radio-frequency carrier signal β. Radio 711-γ generates modulated radio-frequency carrier signal γ. Radio 711-δ generates modulated radio-frequency carrier signal S. Radio 711-ε generates modulated radio-frequency carrier signal E. The structure of modulated radio-frequency carrier signal α, modulated radio-frequency carrier signal β, modulated radio-frequency carrier signal γ, modulated radio-frequency carrier signal δ, and modulated radio-frequency carrier signal ε is such that a wireless terminal can recognize and distinguish each signal. The frequency of signal α, signal β, signal γ, signal δ, and signal ε is approximately the same. It will be clear to those skilled in the art, after reading this disclosure, how to make and use alternative embodiments of the present invention in which the frequency of the radiated signals is not approximately the same.

In some alternative embodiments of the present invention, each radio in radio bank 711 does not comprise distinct hardware but rather is a "software-defined" radio in a "block" or software-defined radio bank. In any case, it will be clear to those skilled in the art how to make and use radio 711-α, radio 711-β, radio 711-γ, radio 711-δ, and radio 711-ε.

Distributed-antenna system 713 comprises eight antennas 713-1 through 713-8. Each of antennas 713-1 through 713-8 is more than one wavelength of signals α, β, γ, δ, and ε from each other (as depicted in FIG. 7B). Furthermore, the phase of the signals radiated by each of antennas 713-1 through 713-8 is uncoordinated (i.e., distributed-antenna system 713 is not a phased-array). And still furthermore, each of each of antennas 713-1 through 713-8 radiates modulated radio-frequency carrier signals α, β, γ, δ, and ε with the same signal strength. It will be clear to those skilled in the art, however, after reading this disclosure, how to make and use alternative embodiments of the present invention in which two or more signals are radiated with a different signal strength. It will be clear to those skilled in the art how to make and use antennas 713-1 through 713-8 in antenna system 713.

Wireline assembly 712-α transports modulated radio-frequency carrier signal α from radio 711-α to antennas 713-1, 713-3, 713-5, and 713-7. Wireline assembly 712-β transports modulated radio-frequency carrier signal β from radio 711-β to antennas 713-2, 713-4, 713-6, and 713-8. Wireline assembly 712-γ transports modulated radio-frequency carrier signal γ from radio 711-γ to antennas 713-3, 713-4, 713-5, and 713-6. Wireline assembly 712-δ transports modulated radio-frequency carrier signal δ from radio 711-δ to antennas 713-5, 713-6, 713-7, and 713-8. Wireline assembly 712-ε transports modulated radio-frequency carrier signal ε from radio 711-ε to antennas 713-1, 713-2, 713-3, 713-4, 713-5, 713-6, 713-7, and 713-8. It will be clear to those skilled in the art how to make and use wireline assemblies 712-α, 712-β, 712-γ, 712-δ, and 712-ε.

FIG. 7B depicts a map view of the service area served by each radio signal and each combination of radio signals in wireless telecommunications system 700 with respect to the location of antennas 713-1 through 713-8 and wireless terminal 721.

Signal α is radiated only by antennas 713-1, 713-3, 713-5, and 713-7 and has a signal strength above a threshold in the areas depicted as service areas 714-α-γ-ε, 714-α-γ-δ-ε, 714-α-δ-ε, 714-α-β-γ-ε, and 714-α-β-δ-ε (i.e., the northern service areas). Signal β is radiated only by antennas 713-2, 713-4, 713-6, and 713-8 and has a signal strength above the threshold in the areas depicted as service areas 714-β-γ-ε, 714-β-γ-δ-ε, 714-β-δ-ε, 714-α-β-γ-ε, and 714-α-β-δ-ε (i.e., the southern service areas). Signal γ is radiated only by antennas 713-1, 713-2, 713-3, and 713-4 and has a signal strength above the threshold in the areas depicted as service areas 714-α-γ-ε, 714-α-γ-δ-ε, 714-α-β-γ-ε, 714-β-γ-ε, and 714-β-γ-δ-ε (i.e., the western service areas). Signal δ is radiated only by antennas 713-5, 713-6, 713-7, and 713-8 and has a signal strength above the threshold in the areas depicted as service areas 714-α-γ-δ-ε, 714-α-δ-ε, 714-α-β-

δ-ε, 714-β-γ-δ-ε, and 714-β-δ-ε (i.e., the eastern service areas). Signal δ is radiated by all eight antennas 713-1, 713-2, 713-3, 713-4, 713-5, 713-6, 713-7, and 713-8 and has a signal strength above the threshold in all of service area 714.

Although distributed-antenna system 713 comprises eight antennas, it will be clear to those skilled in the art, after reading this disclosure, how to make and use alternative embodiments of the present invention that comprise any number of antennas. Furthermore, it will be clear to those skilled in the art, after reading this disclosure, how to make and use alternative embodiments of the present invention in which the antennas have any spatial relationship to each other.

What is claimed is:

1. A wireless telecommunications system that employs a distributed-antenna system to provide wireless telecommunications service to a wireless terminal, the wireless telecommunications system comprising:
    a first antenna located at a first location that:
        (i) radiates a first modulated radio-frequency carrier signal, and
        (ii) radiates a second modulated radio-frequency carrier signal, and
        (iii) does not radiate a third modulated radio-frequency carrier signal;
    a second antenna located at a second location that:
        (i) does not radiate the first modulated radio-frequency carrier signal, and
        (ii) radiates the second modulated radio-frequency carrier signal, and
        (iii) radiates the third modulated radio-frequency carrier signal;
    a radio bank for generating the first modulated radio-frequency carrier signal, the second modulated radio-frequency carrier signal, and the third modulated radio-frequency carrier signal, wherein:
        (i) the second modulated radio-frequency carrier signal is distinguishable by the wireless terminal from the first modulated radio-frequency carrier signal, and
        (ii) the third modulated radio-frequency carrier signal is distinguishable by the wireless terminal from the first modulated radio-frequency carrier signal, and
        (iii) the third modulated radio-frequency carrier signal is distinguishable by the wireless terminal from the second modulated radio-frequency carrier signal;
    a first wireline assembly for transporting the first modulated radio-frequency carrier signal from the radio bank to the first antenna;
    a second wireline assembly for transporting the second modulated radio-frequency carrier signal from the radio bank to the first antenna and to the second antenna; and
    a third wireline assembly for transporting the third modulated radio-frequency carrier signal from the radio bank to the second antenna.

2. The wireless telecommunications system of claim 1 further comprising:
    a third antenna located at a third location that:
        (i) radiates the first modulated radio-frequency carrier signal, and
        (ii) radiates a fourth modulated radio-frequency carrier signal;
    wherein the radio bank also generates the fourth modulated radio-frequency carrier signal so that:
        (i) the fourth modulated radio-frequency carrier signal is distinguishable by the wireless terminal from the first modulated radio-frequency carrier signal, and
        (ii) the fourth modulated radio-frequency carrier signal is distinguishable by the wireless terminal from the second modulated radio-frequency carrier signal, and
        (iii) the fourth modulated radio-frequency carrier signal is distinguishable by the wireless terminal from the third modulated radio-frequency carrier signal;
    wherein the first wireline assembly also transports the first modulated radio-frequency carrier signal from the radio bank to the third antenna; and
    a fourth wireline assembly for transporting the fourth modulated radio-frequency carrier signal from the radio bank to the third antenna.

3. The wireless telecommunications system of claim 2 wherein:
    (i) the first modulated radio-frequency carrier signal, as radiated by the first antenna, has a signal strength above a threshold in a first region, and
    (ii) the first modulated radio-frequency carrier signal, as radiated by the third antenna, has a signal strength above the threshold in a second region, and
    (iii) the first region and the second region intersect.

4. The wireless telecommunications system of claim 2 wherein:
    (i) the first modulated radio-frequency carrier signal, as radiated by the first antenna, has a signal strength above a threshold in a first region, and
    (ii) the first modulated radio-frequency carrier signal, as radiated by the third antenna, has a signal strength above the threshold in a second region, and
    (iii) the first region and the second region do not intersect.

5. The wireless telecommunications system of claim 1 further comprising:
    a third antenna located at a third location that:
        (i) radiates the first modulated radio-frequency carrier signal, and
        (ii) radiates the second modulated radio-frequency carrier signal, and
        (iii) does not radiate the third modulated radio-frequency carrier signal;
    a fourth antenna located at a fourth location that:
        (i) does not radiate the first modulated radio-frequency carrier signal, and
        (ii) radiates the second modulated radio-frequency carrier signal, and
        (iii) radiates the third modulated radio-frequency carrier signal;
    wherein the first wireline assembly also transports the first modulated radio-frequency carrier signal from the radio bank to the third antenna;
    wherein the second wireline assembly also transports the second modulated radio-frequency carrier signal from the radio bank to the third antenna and to the fourth antenna;
    wherein the third wireline assembly also transports the third modulated radio-frequency carrier signal from the radio bank to the fourth antenna.

6. The wireless telecommunications system of claim 1 wherein:
    (i) the second modulated radio-frequency carrier signal, as radiated by the first antenna, has a signal strength above a threshold in a first region, (ii) the second modulated radio-frequency carrier signal, as radiated by the second antenna, has a signal strength above the threshold in a second region, and
(iii) the first region and the second region intersect.

7. The wireless telecommunications system of claim 1 wherein:
   (i) the second modulated radio-frequency carrier signal, as radiated by the first antenna, has a signal strength above a threshold in a first region,
   (ii) the second modulated radio-frequency carrier signal, as radiated by the second antenna, has a signal strength above the threshold in a second region, and
   (iii) the first region and the second region do not intersect.

8. The wireless telecommunications system of claim 1 further comprising:
   a third antenna located at a third location that:
      (i) radiates the first modulated radio-frequency carrier signal, and
      (ii) does not radiate the second modulated radio-frequency carrier signal, and
      (iii) radiates the third modulated radio-frequency carrier signal;
   wherein the first wireline assembly also transports the first modulated radio-frequency carrier signal from the radio bank to the third antenna;
   wherein the third wireline assembly also transports the third modulated radio-frequency carrier signal from the radio bank to the third antenna.

9. The wireless telecommunications system of claim 8 wherein:
   (i) the second modulated radio-frequency carrier signal, as radiated by the first antenna, has a signal strength above a threshold in a first region, and
   (ii) the second modulated radio-frequency carrier signal, as radiated by the second antenna, has a signal strength above the threshold in a second region, and
   (iii) the first region and the second region intersect, and
   (iv) the first modulated radio-frequency carrier signal, as radiated by the first antenna, has a signal strength above the threshold in a third region, and
   (v) the first modulated radio-frequency carrier signal, as radiated by the third antenna, has a signal strength above the threshold in a fourth region, and
   (vi) the third region and the fourth region intersect.

10. The wireless telecommunications system of claim 8 wherein:
    (i) the second modulated radio-frequency carrier signal, as radiated by the first antenna, has a signal strength above a threshold in a first region, and
    (ii) the second modulated radio-frequency carrier signal, as radiated by the second antenna, has a signal strength above the threshold in a second region, and
    (iii) the first region and the second region intersect, and
    (iv) the first modulated radio-frequency carrier signal, as radiated by the first antenna, has a signal strength above the threshold in a third region, and
    (v) the first modulated radio-frequency carrier signal, as radiated by the third antenna, has a signal strength above the threshold in a fourth region, and
    (vi) the third region and the fourth region do not intersect.

11. A wireless telecommunications system that employs a distributed-antenna system to provide wireless telecommunications service to a wireless terminal, the wireless telecommunications system comprising:
    a first antenna located at a first location that:
       (i) radiates a first modulated radio-frequency carrier signal, and
       (ii) radiates a second modulated radio-frequency carrier signal, and
       (iii) radiates a third modulated radio-frequency carrier signal, and
       (iv) does not radiate a fourth modulated radio-frequency carrier signal;
    a second antenna located at a second location that:
       (i) does not radiate the first modulated radio-frequency carrier signal, and
       (ii) radiates the second modulated radio-frequency carrier signal, and
       (iii) radiates the third modulated radio-frequency carrier signal, and
       (iv) radiates the fourth modulated radio-frequency carrier signal;
    a radio bank for generating the first modulated radio-frequency carrier signal, the second modulated radio-frequency carrier signal, the third modulated radio-frequency carrier signal, and the fourth modulated radio-frequency carrier signal, wherein:
       (i) the second modulated radio-frequency carrier signal is distinguishable by the wireless terminal from the first modulated radio-frequency carrier signal,
       (ii) the third modulated radio-frequency carrier signal is distinguishable by the wireless terminal from the first modulated radio-frequency carrier signal,
       (iii) the third modulated radio-frequency carrier signal is distinguishable by the wireless terminal from the second modulated radio-frequency carrier signal,
       (iv) the fourth modulated radio-frequency carrier signal is distinguishable by the wireless terminal from the first modulated radio-frequency carrier signal,
       (v) the fourth modulated radio-frequency carrier signal is distinguishable by the wireless terminal from the second modulated radio-frequency carrier signal, and
       (vi) the fourth modulated radio-frequency carrier signal is distinguishable by the wireless terminal from the third modulated radio-frequency carrier signal; and
    a first wireline assembly for transporting the first modulated radio-frequency carrier signal from the radio bank to the first antenna;
    a second wireline assembly for transporting the second modulated radio-frequency carrier signal from the radio bank to the first antenna and to the second antenna;
    a third wireline assembly for transporting the third modulated radio-frequency carrier signal from the radio bank to the first antenna and to the second antenna;
    a fourth wireline assembly for transporting the fourth modulated radio-frequency carrier signal from the radio bank to the second antenna.

12. The wireless telecommunications system of claim 11 further comprising:
    a third antenna located at a third location that:
       (i) radiates the first modulated radio-frequency carrier signal, and
       (ii) radiates the second modulated radio-frequency carrier signal, and
       (iii) radiates the third modulated radio-frequency carrier signal, and
       (iv) does not radiate the fourth modulated radio-frequency carrier signal;
    a fourth antenna located at a fourth location that:
       (i) does not radiate the first modulated radio-frequency carrier signal, and (ii) radiates the second modulated radio-frequency carrier signal, and
(iii) radiates the third modulated radio-frequency carrier signal, and
(iv) radiates the fourth modulated radio-frequency carrier signal;
wherein the first wireline assembly also transports the first modulated radio-frequency carrier signal from the radio bank to the third antenna;
wherein the second wireline assembly also transports the second modulated radio-frequency carrier signal from the radio bank to the third antenna and to the fourth antenna;
wherein the third wireline assembly also transports the third modulated radio-frequency carrier signal from the radio bank to the third antenna and to the fourth antenna;
wherein the fourth wireline assembly also transports the fourth modulated radio-frequency carrier signal from the radio bank to the fourth antenna.

13. The wireless telecommunications system of claim 11 wherein:
(i) the second modulated radio-frequency carrier signal, as radiated by the first antenna, has a signal strength above a threshold in a first region,
(ii) the second modulated radio-frequency carrier signal, as radiated by the second antenna, has a signal strength above the threshold in a second region, and
(iii) the first region and the second region intersect.

14. The wireless telecommunications system of claim 11 wherein:
(i) the second modulated radio-frequency carrier signal, as radiated by the first antenna, has a signal strength above a threshold in a first region,
(ii) the second modulated radio-frequency carrier signal, as radiated by the second antenna, has a signal strength above the threshold in a second region, and
(iii) the first region and the second region do not intersect.

15. The wireless telecommunications system of claim 11 further comprising:
a third antenna located at a third location that:
(i) radiates the first modulated radio-frequency carrier signal, and
(ii) does not radiate the second modulated radio-frequency carrier signal, and
(iii) radiates the fourth modulated radio-frequency carrier signal;
wherein the first wireline assembly also transports the first modulated radio-frequency carrier signal from the radio bank to the third antenna;
wherein the fourth wireline assembly also transports the fourth modulated radio-frequency carrier signal from the radio bank to the third antenna.

16. The wireless telecommunications system of claim 15 wherein:
(i) the second modulated radio-frequency carrier signal, as radiated by the first antenna, has a signal strength above a threshold in a first region, and
(ii) the second modulated radio-frequency carrier signal, as radiated by the second antenna, has a signal strength above the threshold in a second region, and
(iii) the first region and the second region intersect, and
(iv) the first modulated radio-frequency carrier signal, as radiated by the first antenna, has a signal strength above the threshold in a third region, and
(v) the first modulated radio-frequency carrier signal, as radiated by the third antenna, has a signal strength above the threshold in a fourth region, and
(vi) the third region and the fourth region intersect.

17. The wireless telecommunications system of claim 15 wherein:
(i) the second modulated radio-frequency carrier signal, as radiated by the first antenna, has a signal strength above a threshold in a first region, and
(ii) the second modulated radio-frequency carrier signal, as radiated by the second antenna, has a signal strength above the threshold in a second region, and
(iii) the first region and the second region intersect, and
(iv) the first modulated radio-frequency carrier signal, as radiated by the first antenna, has a signal strength above the threshold in a third region, and
(v) the first modulated radio-frequency carrier signal, as radiated by the third antenna, has a signal strength above the threshold in a fourth region, and
(vi) the third region and the fourth region do not intersect.

18. A wireless telecommunications system that employs a distributed-antenna system to provide wireless telecommunications service to a wireless terminal, the wireless telecommunications system comprising:
a first antenna located at a first location that:
(i) radiates a first modulated radio-frequency carrier signal, and
(ii) radiates a second modulated radio-frequency carrier signal, and
(iii) does not radiate a third modulated radio-frequency carrier signal, and
(iv) does not radiate a fourth modulated radio-frequency carrier signal, and
(v) radiates a fifth modulated radio-frequency carrier signal;
a second antenna located at a second location that:
(i) does not radiate the first modulated radio-frequency carrier signal, and
(ii) radiates the second modulated radio-frequency carrier signal, and
(iii) radiates the third modulated radio-frequency carrier signal, and
(iv) does not radiate the fourth radio-frequency carrier signal, and
(v) radiates the fifth modulated radio-frequency carrier signal;
a third antenna located at a third location that:
(i) does not radiate the first modulated radio-frequency carrier signal, and
(ii) does not radiate the second modulated radio-frequency carrier signal, and
(iii) radiates the third modulated radio-frequency carrier signal, and
(iv) radiates the fourth modulated radio-frequency carrier signal, and
(v) radiates the fifth modulated radio-frequency carrier signal;
a radio bank for generating the first modulated radio-frequency carrier signal, the second modulated radio-frequency carrier signal, the third modulated radio-frequency carrier signal, the fourth modulated radio-frequency carrier signal, and the fifth modulated radio-frequency carrier signal, wherein:
(i) the second modulated radio-frequency carrier signal is distinguishable by the wireless terminal from the first modulated radio-frequency carrier signal, and (ii) the third modulated radio-frequency carrier signal is distinguishable by the wireless terminal from the first modulated radio-frequency carrier signal, and
(iii) the third modulated radio-frequency carrier signal is distinguishable by the wireless terminal from the second modulated radio-frequency carrier signal, and
(iv) the fourth modulated radio-frequency carrier signal is distinguishable by the wireless terminal from the first modulated radio-frequency carrier signal, and
(v) the fourth modulated radio-frequency carrier signal is distinguishable by the wireless terminal from the second modulated radio-frequency carrier signal, and
(vi) the fourth modulated radio-frequency carrier signal is distinguishable by the wireless terminal from the third modulated radio-frequency carrier signal, and
(vii) the fifth modulated radio-frequency carrier signal is distinguishable by the wireless terminal from the first modulated radio-frequency carrier signal, and
(viii) the fifth modulated radio-frequency carrier signal is distinguishable by the wireless terminal from the second modulated radio-frequency carrier signal, and
(ix) the fifth modulated radio-frequency carrier signal is distinguishable by the wireless terminal from the third modulated radio-frequency carrier signal, and
(x) the fifth modulated radio-frequency carrier signal is distinguishable by the wireless terminal from the fourth modulated radio-frequency carrier signal; and
a first wireline assembly for transporting the first modulated radio-frequency carrier signal from the radio bank to the first antenna;
a second wireline assembly for transporting the second modulated radio-frequency carrier signal from the radio bank to the first antenna and to the second antenna;
a third wireline assembly for transporting the third modulated radio-frequency carrier signal from the radio bank to the second antenna and to the third antenna;
a fourth wireline assembly for transporting the fourth modulated radio-frequency carrier signal from the radio bank to the third antenna; and
a fifth wireline assembly for transporting the fifth modulated radio-frequency carrier signal from the radio bank to the first antenna, the second antenna, and the third antenna.

\* \* \* \* \*